Nov. 4, 1958 W. H. SHAPERO 2,858,567
DIP-FORMING APPARATUS
Filed Feb. 15, 1956 4 Sheets-Sheet 4

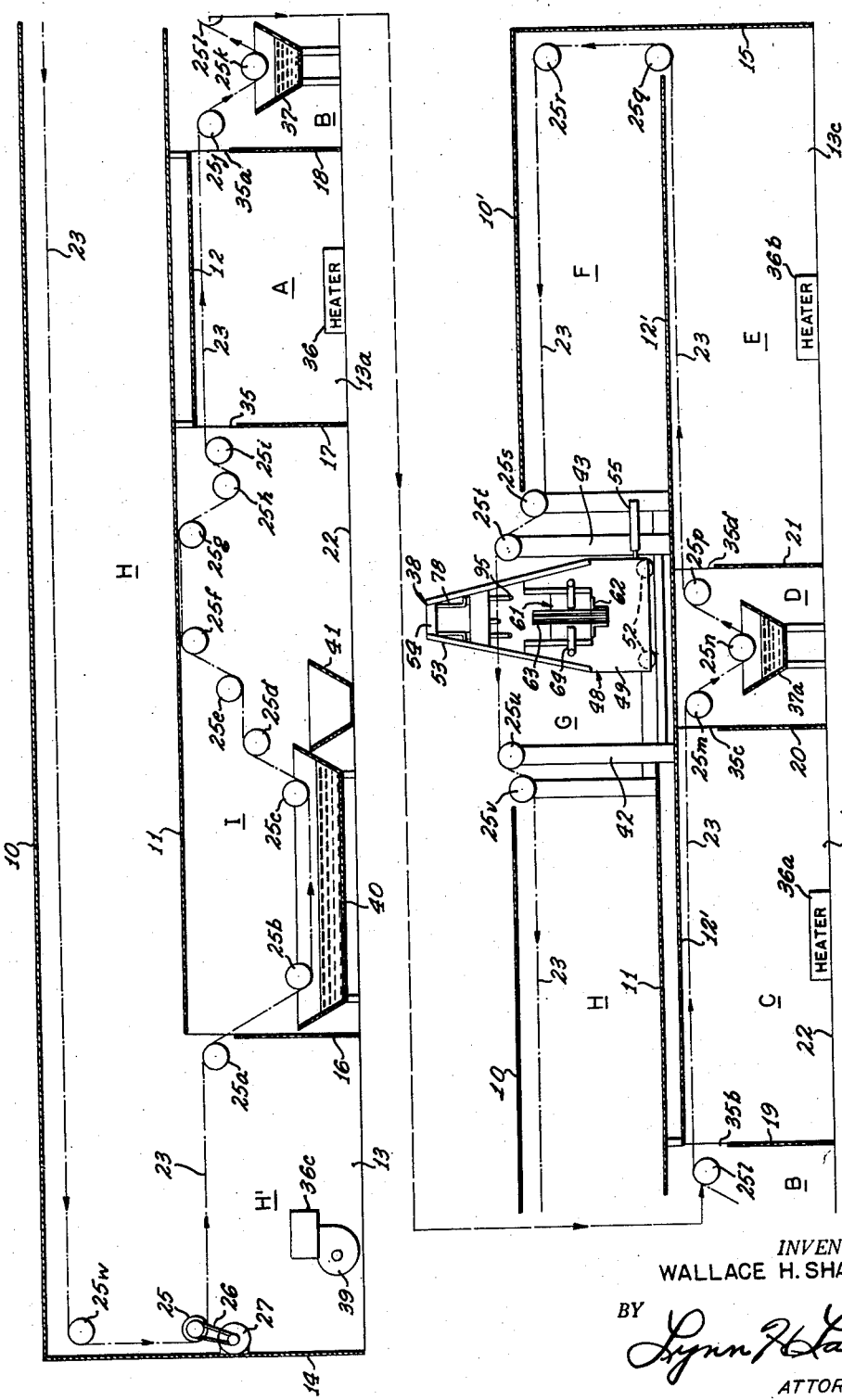

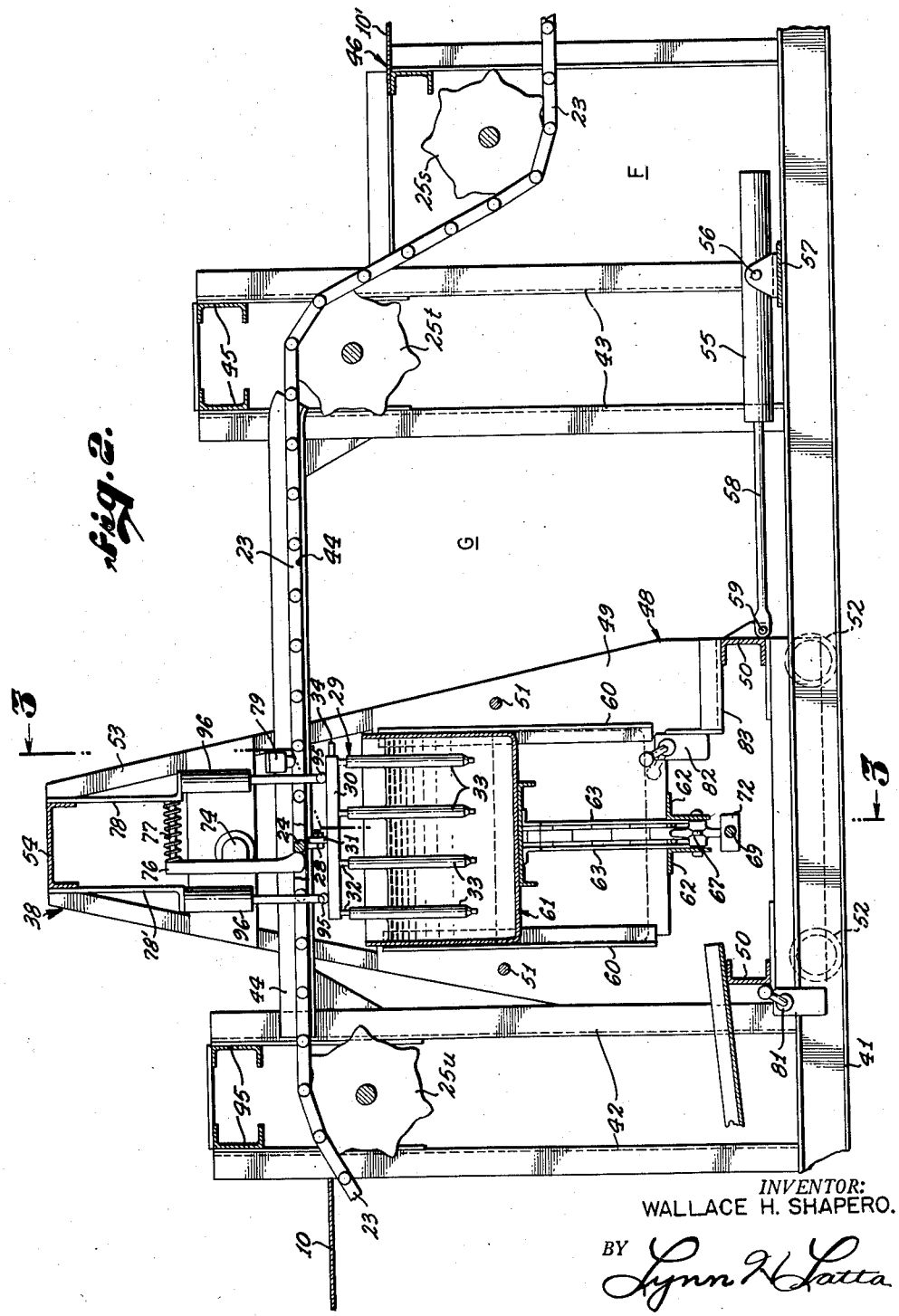

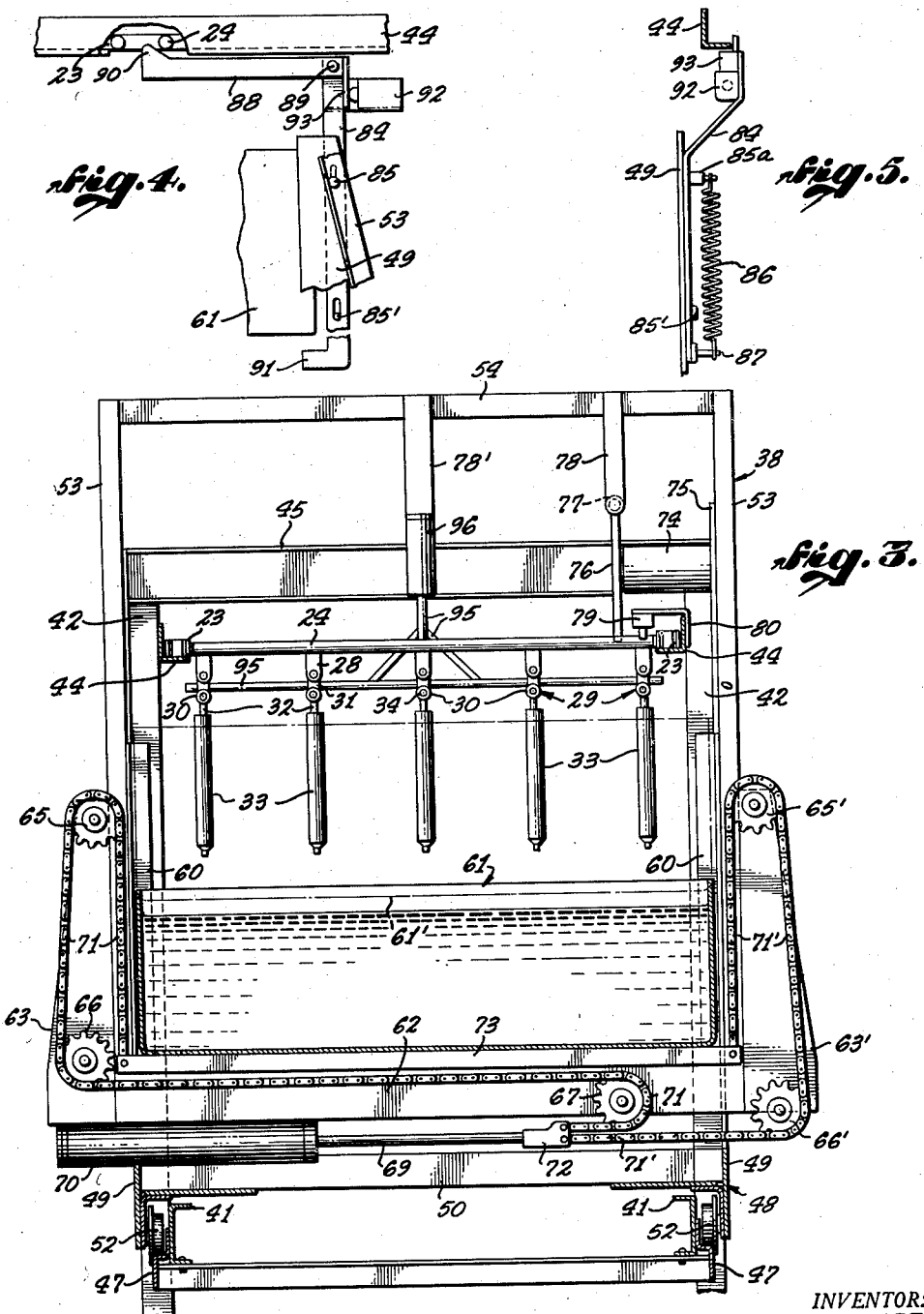

INVENTOR:
WALLACE H. SHAPERO.
BY Lynn H. Latta
ATTORNEY.

United States Patent Office 2,858,567
Patented Nov. 4, 1958

2,858,567

DIP-FORMING APPARATUS

Wallace H. Shapero, Pacific Palisades, Calif., assignor to Wallace Container Company, Santa Ana, Calif., a corporation of California Application February 15, 1956, Serial No. 565,719

10 Claims. (Cl. 18—24)

This invention relates to the dip-forming of tubular articles such as flexible containers. This application is in part a continuation of my pending applications, Serial No. 249,269, now Patent No. 2,786,238, filed October 2, 1951, for Dip Method of Fabricating Flexible Containers of Synthetic Resin Materials; Serial No. 303,597, now abandoned, filed October 9, 1952, for Flexible Containers and Method of Making the Same; Serial No. 384,493, filed October 6, 1953, for Dipping Mandrel and Method of Releasing Dipped Plastic Parts Therefrom; and Serial No. 384,494, filed October 6, 1953, for Method and Apparatus for Forming Hollow Bodies.

The general object of the present invention is to provide an improved apparatus for dip-forming tough, strong, flexible walled containers and other hollow articles of synthetic resin plastic material. A major object is to provide an apparatus for dip-forming hollow articles of uniform wall thickness. A specific object is to provide for the fabrication of containers and the like having wall structure which can be easily and satisfactorily decorated by printing processes. Successful imprinting of such a container wall requires uniformity in wall thickness.

To be commercially successful, such articles must ordinarily include a pigment to impart an opaque character or a selected color to the articles. In meeting this requirement, and when attempt is made to meet the demand for a container of uniform wall thickness throughout its length and circumference, I find that the problem of uneven distribution of material in the several layers of the article is encountered. Such problem is made especially difficult by the very obvious unevenness of color depth when an uneven distribution of material in the pigmented layer occurs. Accordingly, an important object of the present invention is to provide an improved apparatus which satisfies the requirement for uniform wall thickness and uniform distribution of pigmented materials.

Another important object of the present invention is to provide an apparatus for the dip-forming of hollow articles of the type referred to, providing for quantity production at a high rate such as to make it possible to produce the articles sufficiently inexpensively to meet and improve upon cost figures of other container-fabricating processes.

In general, the invention contemplates an apparatus wherein a series of mandrels, carried by an endless conveyor, are dipped into a body of liquid plastic material without interrupting or slowing down the movement of the conveyor, and the invention provides automatic mechanism, triggered by the conveyor, for moving a dip tank in a path which follows the conveyor movement and simultaneously rises and falls so that the tank will present the dipping bath to the mandrels and then withdraw it to effect the dipping operation, all movements being executed automatically.

A further object is to provide an improved apparatus for dip-forming multi-layer containers resistant to the deteriorative effect of contents of oily texture or other deteriorative character, and impervious to the pentrative action of such contents and of aqueous contents. To this end, the invention contemplates, in general, an improved apparatus for dip-forming such articles in a succession of dipping stages wherein layers of chemically different plastic materials are successively applied to a series of dipping mandrels on which the articles are shaped. To this end, the invention contemplates an apparatus wherein the conveyor-carried mandrels are successively dipped into a series of vats containing respective liquid plastic material for the various coatings of the articles to be fabricated, a series of thin coatings including a lining and several intermediate layers being deposited by relatively simple dipping operations and, finally, a relatively thick body coating containing the selected pigment, being applied in a dipping operation wherein the liquid plastic material of such body coating is moved synchronously with the continuing movement of the dipping mandrels so as to avoid any substantial relative movement between the mandrels and the liquid in a direction transverse to the mandrel axes.

Other objects will become apparent in the ensuing specifications and appended drawing in which:

Figure 1 is a schematic diagram of an apparatus embodying the invention;

Figure 2 is a longitudinal sectional view of the body-dip portion of the apparatus;

Figure 3 is a transverse sectional view thereof taken on the line 3—3 of Figure 2;

Figure 4 is a detail fragmentary side elevation of the same showing the fail-safe conveyor-stopping control unit thereof;

Figure 5 is a transverse view of the unit of Figure 4;

Figure 6:
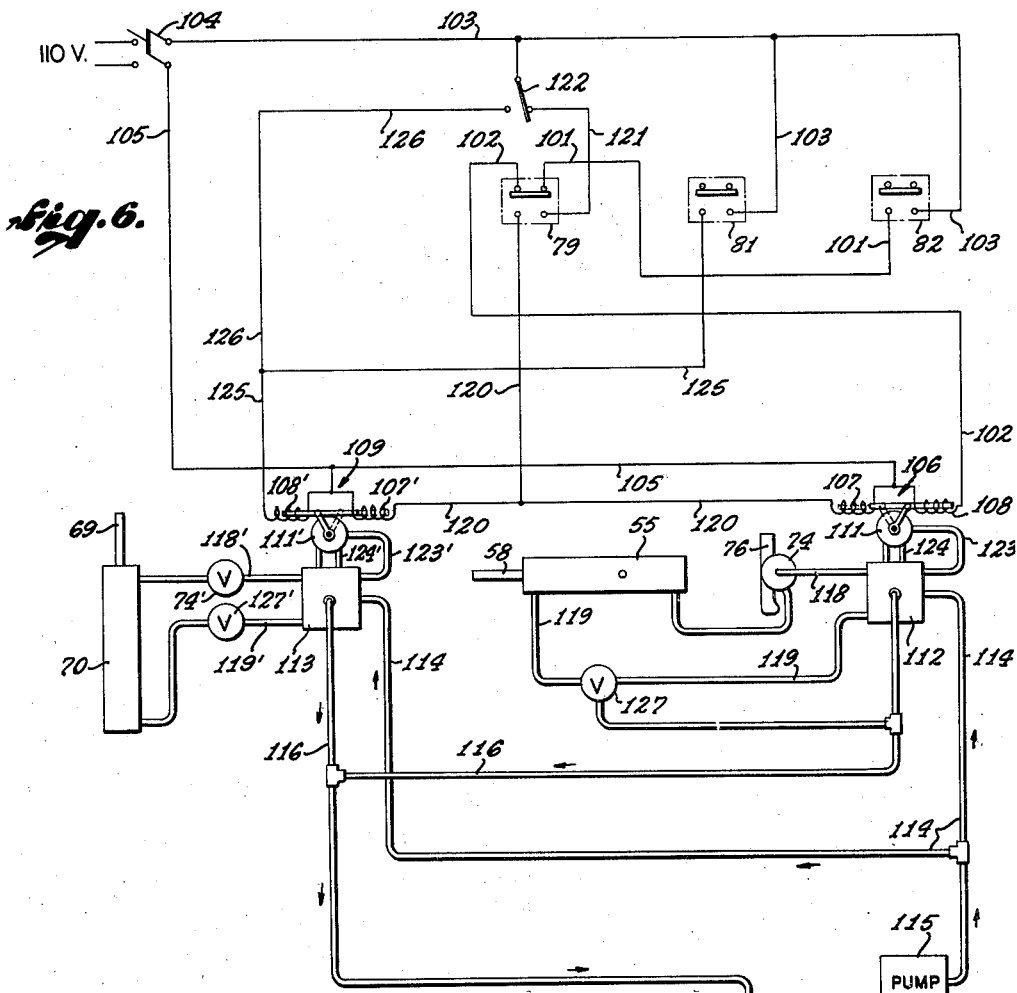
Figure 6 is a schematic control diagram of the body-dip mechanism.
Figure 7:
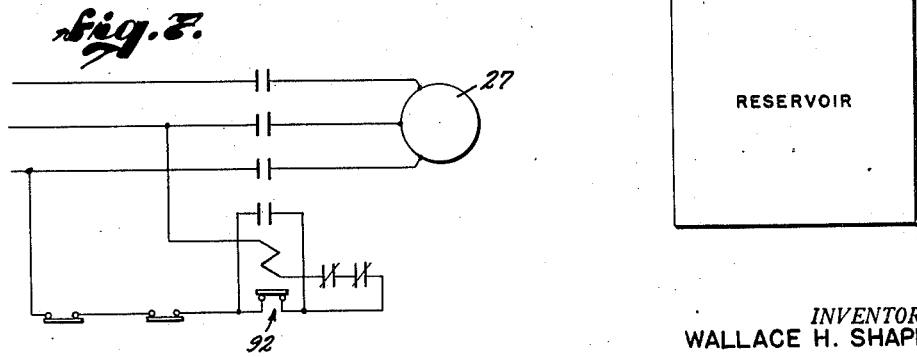
Figure 7 is a schematic control diagram of the fail-safe control.

This invention may be utilized in the fabrication of hollow articles having one or any selected plural number of layers (e. g. a three-layer container as disclosed in my pending application, Serial No. 419,515, filed March 29, 1954, for Flexible Tube Container and Method for Making the Same, or a four, five or six layer container as disclosed in my pending application, Serial No. 524,993 now Patent No. 2,815,866, filed July 28, 1955, for Flexible Container). In the case of a multiple-layer tube, a plurality of mandrels are successively dipped into bodies of liquid plastic materials of differing nature chemically, the first dip depositing a coating which will readily strip from the mandrel and which becomes the lining of the container; an intermediate coating or coatings being then deposited to provide barrier layers to resist migration of contents outwardly and of plasticizer (from the outer body layer) inwardly; and the relatively thick outer body layer being finally deposited.

As one phase of the operation utilizing the apparatus of my invention, to simplify the over-all process, to conserve on material, and to attain maximum thinness and flexibility in the container wall, the initial coatings are quite thin, and are deposited with a simple dipping operation in which the mandrels are moved through static bodies of liquid plastic materials of high fluidity such as to provide for the very thin coatings. These inner coatings may be of unpigmented material (e. g. clear plastic material) of such thinness as to add such a small percentage of opacity to the complete container wall, that they will not visibly affect the uniformity of color depth that is attained in the final coating, for which a much more complex dipping operation is utilized. I find that satisfactory stripping and barrier qualities can be attained in such relatively thin inner coatings when adequately supported by the relatively thick outer body layer of the container.

As disclosed in the aforesaid prior application, Serial No. 524,993, a lining may have a thickness only five percent to ten percent of the total wall thickness; the intermediate layers may have a thickness only five percent to fifteen percent of the total thickness; and the outer body layer may have a thickness comprising from seventy-five percent to ninety percent of the total thickness. The body layer is of a tough flexible, heat sealable plastic material comprising a mixture of plasticizer and a synthetic resin such as polyvinyl chloride or a co-polymer of said chloride and another resin. The mixture may be a plastisol including a plasticizer such as di-2-ethyl hexyl phthlate or a related material, without solvent but in the form of a fairly viscous liquid until hardened by a heat-curing step. On the other hand, the dipping materials for the inner layers, in order to be deposited sufficiently thinly, are rendered more fluid by the addition of solvents which are driven off subsequent to the curing step. Film tension and adhesion are sufficient to provide satisfactorily uniform wall thickness in these inner layers despite the relative movement between the mandrels and the bodies of liquid plastic material in the earlier dipping steps. In the final dipping step in which the mandrels are dipped into the relatively viscous plastisol in order to deposit the relatively thick body layer, the plastisol body is moved in synchronism with the mandrels and the mandrels are carefully dipped by a purely axial movement thereof into and out of the plastisol body, with an absolute minimum of relative movement radially of the mandrel axes.

As applied to the dip-forming of a single-layer container, the invention utilizes simply the steps of pre-heating the mandrels; moving them horizontally while supported in depending positions; moving a bath of liquid plastic material horizontally in synchronism with the mandrels and simultaneously elevating it into enveloping contact with the mandrels to effect the dipping operation; then withdrawing it downwardly while maintaining its forward travel synchronized with that of the mandrels; then returning the bath horizontally to a starting position while moving the mandrels onward to a heating zone; and there curing the coatings on the mandrels by the application of heat thereto.

General description of apparatus

Referring now to Figure 1 of the drawings, the overall apparatus is shown schematically rather than in detail, the various components being individually of conventional structure and only their sequential arrangement and operation being of importance in the invention. Consequently, the cross sectional showing of housing and vat structures are indicated by the heavy solid black lines, and conveyor chain and sprocket structure are schematically indicated by dot-dash lines and circles respectively. For the final dipping unit, wherein novel structure is utilized, such structure is shown in detail in the other figures of the drawings.

The housing structure includes, in general, horizontal top and intermediate deck sections 10, 11, 12 and 12', side walls 13, 13a, 13b and 13c, end walls 14 and 15, and transverse partitions 16, 17, 18, 19, 20, 21, etc., together with a floor 22 (which may be the concrete floor of the building in which the apparatus is installed), all cooperating to define a series of heating chambers and intervening processing spaces which, in the order of consecutive passage of a set of mandrels therethrough, are indicated by the reference characters, A, B, C, D, E, F, G, H, H' and I.

An endless conveyor, consisting in two endless link chains 23, bridged by a succession of transverse mandrel supporting bars 24, are trained around a series of sprockets 25, 25a, 25b, 25c, 25d, 25e, 25f, 25g, 25h, 25i, 25j, 25k, 25l, 25m, 25n, 25p, 25q, 25r, 25s, 25t, 25u, 25v, 25w, etc., and are driven by a suitable drive 26 from an electric motor 27.

Referring now to Figures 2 and 3, each transverse conveyor bar 24 is provided with a plurality of fittings 28 adapted to support respective mandrel gangs 29. Each gang 29 comprises a tubular manifold 30 having a hanger fitting 31 for attachment to fitting 28 in a manner such as to dispose the manifold crosswise to the hanger rod 24 and parallel to the path of conveyor travel. The manifold 30 has a series of connections 32 for supporting respective tubular mandrels 33, and at its one end, each manifold 30 has a neck 34 through which air under pressure may be injected, to pass through connections 32 into mandrels 33 and thereupon be discharged through valved openings in the lower ends of mandrels 33 to inflate and discharge from the mandrels, the finished containers that have been formed thereon.

The various processing chambers and spaces A to I, and the apparatus therein, are as follows:

A. In this chamber, defined by partitions 17 and 18, side walls 13a and top wall 12, the mandrels, carried by conveyor 23, 24, enter and leave through doors 35 and 35a, travel lengthwise through the chamber, and are preheated therein. Such heating may be effected by heating the atmosphere in the chamber, as by means of a suitable heater such as is indicated at 36. Alternative heating methods are discussed hereinafter.

B. This is an open space without sides, containing a dipping vat 37 which, in turn, holds the dipping solution for the container lining. The conveyor chains dip downwardly around sprockets 25j and thence upwardly around sprockets 25k and over sprocket 25l for entry into the next chamber.

C. In this chamber, entered through a door 35b, the lining coatings are dried and cured, as by the atmosphere therein, heated by a heater 36a. The chamber is defined by side walls 13b, intermediate deck 12' and partitions 19, 20. The conveyor leaves this chamber through a door 35c.

D. This is an open space, without sides, in which is supported a vat 37a containing a thin dipping solution for the intermediate barrier layer which is deposited on the mandrels as they dip downwardly in a path described by sprockets 25m, 25n and 25p, respectively. As in the case of vat 37, the solution in vat 37a is static and the mandrels move through it with a swinging movement.

E. This chamber, defined by deck 12', partition 21, end wall 15 and side walls 13c, may be heated by a heater 36b. In this chamber, the intermediate barrier coating is dried and cured, the conveyor entering the chamber through a door 35d.

F. This chamber is likewise a curing chamber, heated by circulation of heated air from chamber E (or by its own separate heater) and may be utilized for continuing the curing operation started in chamber E. Alternatively, if an additional intermediate layer is to be deposited, there may be another dipping vat (not shown) interposed between chambers E and F. Chamber F is defined between top wall 10', intermediate deck 12', side walls 13c and end wall 15.

G. This is an open space without sides, in which is disposed the movable dipping tank and follower apparatus which is indicated generally by the reference numeral 38 and which will be described in detail hereinafter. In this area, the final body coat is applied to the mandrels in the manner hereinbefore indicated.

H. This is an extremely long curing chamber in which the relatively thick body coat is hardened and cured. It extends from final dipping space G back to the beginning end of the apparatus, where the conveyor dips downwardly around sprockets 25w returning to drive sprockets 25. The chamber is defined between side walls 13, top walls 10, intermediate deck 11 and end wall 14. It may be heated by a heater 36c located in chamber H' and circulating hot air throughout the length of chamber H, circulation being provided by a suitable blower 39.

The pre-heating and curing operations may utilize, instead of heated atmosphere, alternative heating methods as follows:

(1) Radiant heating (e. g. infra-red).
(2) Induction heating by high frequency electromagnetic fields or radio frequency electric fields.
(3) (For the final dipping operation only). Dipping the coated mandrels into a heated liquid bath. In particular, the invention contemplates dipping in heated carbowax, to effect simultaneously:

(a) Curing
(b) Removal of plasticizer from the surfaces of the containers, thus cleaning them and providing dry, printable surfaces in preparation for subsequent printing operations.

H. This chamber may contain the main heating apparatus and operating mechanism.

I. This is an open space without sides, in which is supported a cooling tank 40 containing cold water. Also located in space I is a receptacle 41 into which the completed containers are discharged by the blow-off operation performed at this station. To support the mandrels at a convenient height for this operation, a horizontal stretch of the conveyor passes between sprockets 25d and 25e and thence passes upwardly to sprockets 25f to lift the mandrels over the head of the operator standing at this station. Thence, the conveyors dip downwardly around sprockets 25g and 25h and thence around sprocket 25i to re-enter chamber A.

The follower tank final dip apparatus

Referring now to Figures 2–5, inclusive, the final dip apparatus embodies a frame structure including horizontal joists 41 disposed approximately at the level of intermediate decks 11, 12, 12', vertical posts 42, 43 which may extend to the floor 22, providing support for joists 41, and suitable bridging members connecting the upper ends of posts 43, including conveyor tracks 44 of angle section, upon which the conveyor chains 23 travel across the space G. The frame structure also includes suitable transverse members 45 providing cross bracing between the upper ends of posts 43, and auxiliary frame structure 46 toward the near end of chamber F.

As shown in Figure 3, tracks 47 are secured to joists 41 to provide for the rolling support of the dipping unit 38.

Dipping unit 38 includes a carriage 48 comprising respective side plates 49 bridged and joined at their lower ends by cross beams 50 and at their mid-height by tie bars 51. The side plates 49 project below cross beams 50 to provide mounting for flanged wheels 52 which ride on tracks 47 to provide a rolling support for carriage 48.

The frame structure of carriage 48 includes booms 53 secured to side plates 49, converging upwardly thereabove and joined by a transverse crown beam 54.

Carriage 48 is adapted to travel horizontally between posts 42 and 43. For effecting such horizontal movements of the carriage, I provide a fluid energized actuator 55 comprising a cylinder tiltably mounted on trunnions 56 in a bracket carried by a suitable support such as transverse bar 57 mounted on joists 41; and including a piston (not shown) and a piston rod 58, the latter being pivotally linked at 59 to a suitable bracket carried by the near cross beam 50 of the carriage 48. The control of actuator 55, 58 will be explained hereinafter. The invention preferably utilizes hydraulic actuators, although it would be possible to utilize pneumatic actuators.

Secured to the side plates 49 are vertical slideways 60 in which a tank 61 is guided for vertical movements.

Side plates 49 are of U shape (Figure 1), including respective pairs of spaced arms defining upper central spaces to accommodate the tank elevating mechanism presently to be described; and including bottom webs, the upper margins of which are bridged by a pair of spaced transverse beams 62, shown as angle bars. Secured to the ends of beams 62 and projecting upwardly, are respective pairs of spaced stanchions 63, 63', braced to the arms of end plates 49 by braces 54 (Figure 1). Upper sprockets 65, 65' and lower sprockets 66, 66' are journalled between stanchions 63, 63'. A fifth sprocket 67 is journalled between beams 62 near sprocket 66'. A hydraulic actuator including a piston rod 69, a piston (not shown) and a cylinder 70 mounted to the lower edges of beams 62, actuates a pair of chains 71, 71' that are anchored to a fitting 72 on the end of piston rod 69. Chains 71, 71' travel in the spaces defined between beams 62 and stanchions 63, passing from fitting 72 around sprockets 67, 66, 66' and 65, 65', respectively, and thence extending downwardly and anchored to respective ends of a tank platform 73 on which tank 61 is seated. When actuator 69, 70 is operated to draw in its piston rod 69, tank 61 will be raised to a top limit position indicated in broken lines at 61' in Figure 3 and shown in full lines in Figure 2. In this position, mandrels 29 will be immersed in the plastisol liquid in tank 61, to the proper depth for the containers being fabricated.

Actuator 55, 68 is operable to move carriage 48, and tank 61, in synchronism with the forward travel of mandrels 29, whereby the relative movements between mandrels 29 and the plastisol body are purely vertical movements along the axes of mandrels 29, and no substantial relative movement transversely of the mandrel axes, will take place. The tendency to accumulate a greater thickness of coating on the one side of a mandrel than on the opposite side, where relative lateral movement takes place, is thereby eliminated.

Controls

The feed of fluid (e. g. oil) to cylinder 55 through a control valve (referred to more specifically hereinafter) is adjusted to a rate such as to approximately equate the rate of travel of piston rod 58 to the rate of travel of conveyor 23, 24. However, to avoid the effect of such variations in rate as may occur through fluctuations in electric power, changes in load resistance, etc., I provide a throttle valve 74, anchored to a mounting plate 75 on arms 53 at one side of the carriage 48, valve 74 being of a rotary type, having an actuator lever 76 attached to its rotor and projecting downwardly into the path of support bars 24, and being arranged to increase the feed of oil to cylinder 55 whenever engaged by a conveyor bar 24 starting to move ahead of its proper position relative to tank 21. Such increased feed of oil to cylinder 55 will speed up the travel of tank 61 just sufficiently to enable it to remain synchronized with conveyor 23, 24.

Lever 76 is biased toward a normal position (in which valve 74 is throttled down) by a coil spring 77 engaged under compression between its projecting upper end and a bracket arm 78 attached to crown beam 54.

Figure 1 shows the retracted, starting position of carriage 48. Its forward movement is initiated by a starting switch 79 mounted on a bracket 80 that is secured to a conveyor track 44, and projects over the same to position the actuator lever of switch 79 for engagement by support bar 24 as the latter meets the carriage 49 in the starting position of the latter.

Switch 79 also starts the operation of actuator 69, 70 to raise tank 61 as the carriage 49 moves forwardly.

The return of tank 61 to its lowered position is initiated by a limit switch 81 which is mounted on a joist 41 and has an actuator lever projecting upwardly for engagement by a cross-beam 50 of carriage 49 as the latter nears its limit of forward travel.

The return of carriage 48 to its starting position is initiated by a limit switch 82 which is carried by a bracket 83 mounted on a cross-beam 50 of carriage 48 and having an actuator lever positioned to be engaged by the bottom of tank 61 as it nears its lowered, starting position. Thus, the carriage cannot start its return movement until the tank has been lowered to clear the mandrels 29, leaving them free to proceed into curing chamber H as the carriage starts its return movement.

Actuator 69, 70 is quick-operating in both directions, whereby tank 61 is rapidly elevated within a relatively small increment of forward travel of carriage 48 after switch 79 has been tripped, and is as rapidly returned to its lowered position during a small terminal increment of forward movement of the carriage. The throttled feed of oil to cylinder 55, commencing when switch 79 is tripped, may be such as to advance the carriage 48 initially at a retarded rate such that support bar 24 may advance, with respect to carriage 48, so as to traverse from starting switch 79 to throttle valve lever 76 during the interval while tank 61 is raised to the point where mandrels 29 commence to dip into the plastisol liquid.

To prevent damage to the mechanism in the event of a failure in the control system such as to leave tank 61 stuck in its elevated position at the limit of forward travel of carriage 48, I provide the "fail-safe" control unit shown in Figures 4 and 5. A slide bar 84 is attached to the inner face of an arm of a carriage side member 49, for limited vertical shifting movements, with lost-motion connections 85, 85', and is biased upwardly by a coil spring 86, connected under tension between a stud 85a anchored in plate 49, and a stud 87 secured to the lower end of bar 84. An arm 88 is pivoted at 89 to the upper end of bar 84, projects horizontally along the inner margin of a conveyor track rail 44, and has at its end an upward cam projection 90 positioned to be engaged by a support bar 24 when bar 84 is elevated. As long as tank 61 makes its normal return movement, however, it will strike a foot 91 at the lower end of bar 84, shifting the latter downwardly so as to remove projection 90 from the path of conveyor bar 24 before the latter can strike the projection.

A limit switch 92 is supported on bar 84 in position to be actuated by a finger 93 projecting downwardly from the arm 88 at pivot 89, in the event bar 24 strikes cam projection 90 to swing arm 88 downwardly.

To accurately position the mandrels 33 for depth, manifolds 30 are engaged by depressers 95 carried by the piston rods of hydraulic actuators 96 which are mounted on brackets 78, 78' and are actuated when bar 24 engages lever 76.

*Control circuit—Figure 6*

Referring now to Figure 6, actuator 55, for moving carriage 38 horizontally, is schematically shown in a horizontal position while actuator 70, for elevating the tank 61, is shown schematically in a vertical position; and switches 79, 81 and 82 are shown in circuit diagram in their cooperative controlling relation. It will be noted that switch 79 is a double pole, double throw switch, whereas switches 81 and 82 are normally open, single throw limit switches. Switch 79, in its normal position, closes a circuit between conductors 101 and 102 of the circuit for initiating carriage return operation of actuator 55. Such return control circuit is completed through switch 82 when carriage 38 engages the latter at its limit of forward travel. Switch 82 closes the circuit between conductors 101 and a conductor 103 coming from one side of a power source such as a common 110 volt source (indicated at 110V), through a master switch 104. The balance of the circuit includes a conductor 105 leading from the other side of source 110V to a valve actuator solenoid 106 of a double-throw type including coils 107 and 108 having the common connection 105 to the power source, and coil 108 being connected to conductor 102 to complete the return control circuit.

Conductor 105 also operates as a common current supply connection to coils 107' and 108' of a second valve actuator solenoid 109, similar to solenoid 106. Solenoids 106 and 109 are arranged to actuate pilot valves 111, 111' respectively of a pair of four-way valves 112, 113 (e. g. Atkinson B-47 solenoid operated valves) each having an inlet port connected to a respective branch of a pressure line 114 coming from a pump 115 of the hydraulic system. Each of the valves 112, 113 includes a discharge port connected to a respective branch of a return line 116 leading to a reservoir 117 from which the hydraulic fluid is withdrawn by pump 115 and pumped into the pressure line 114. Each of the valves 112, 113 has third and fourth ports connected respectively to fluid lines 118, 119, 118', 119' leading to respective ends of the respective actuators 55, 70 as shown, and adapted to function alternatively as delivery and return lines depending on the positions of valves 112, 113. In forward stage positions of valves 112, 113, fluid coming from pressure line 114 is routed to lines 118, 118', through which delivery is made to actuators 55, 70 to effect forward travel of carriage 38 and elevating movement of tank 61 respectively. Fluid expelled from actuators 55, 70 by the advancing movements of their respective pistons will return flow through lines 119, 119' respectively, to valves 112, 113, through which such return flows will be routed to return line 116. Valves 112, 113 are actuated to such forward stage positions by reversal of pilot valves 111, 111' from their positions shown, to alternate positions indicated in broken lines. In such alternate positions, pilot valves effect the reversal of valves 112, 113 to their positions wherein they route the hydraulic fluid in the manner described above. The actuation of pilot valves 111, 111' to such alternate positions is effected by energizing solenoid coils 107, 107'. This is provided for by a common conductor 120 coming from switch 79 and connected in parallel to coils 107, 107'. Conductor 120 is connected to one of the contacts of switch 79 upon which the switch closes when the switch actuator is tripped by passage of a conveyor bar 24. The other of this pair of contacts is connected to a conductor 121 leading to one side of a double-throw manual switch 122, which in turn is connected to line conductor 103.

The reversal of switch 79 from its normal position to its alternate position endures for only the short interval that bar 24 is in contact with its actuator button, but the interval is long enough to effect the reversal of both solenoids 106 and 109 and their respective pilot valves 111, 111'. Pilot valves 111, 111' receive pressure fluid through feed lines 123, 123' and direct such fluid to the reversing actuators of valves 112, 113 through connections 124, 124', for shifting the valves 112, 113 alternately to their forward stage and then to their return stage positions.

It will now be apparent that when switch 79 is actuated to close the circuit between conductors 120, 121, actuator 55 will be energized for forward travel of the carriage and actuator 70 will simultaneously be energized for elevation of the tank.

Switch 81, when actuated by carriage 38, as the latter approaches its forward limit of travel, will close a circuit between line conductor 103 and a conductor 125 leading to solenoid coil 108', thus reversing valve 113 for downward return movement of tank 61. Since switch 79 will have returned to its normal position, as shown, before this stage of operation is reached, coil 107' will be dead and will not oppose the reversal.

In the event an operator wishes for any reason to reverse the tank movement before limit switch 81 is actuated, the manual switch 122 can be shifted from its normal position shown in Figure 6, to an alternate position connecting line conductor 103 to a shunt conductor 126 leading to solenoid coil 108'.

Throttle valve 74, being interposed in fluid line 118 between valve 112 and actuator 55, will control the rate of feed of hydraulic fluid to actuator 55 in such a way as to maintain exact synchronism between carriage 38 and the conveyor. A speed control valve 74' is interposed in line 118' also, to control the rate of feed of hydraulic fluid to tank elevating actuator 70, but is preset at a fixed rate which may be adjusted to the proper value to effect elevation of the tank during a selected portion of the total carriage travel.

Rates of return travel of tank 61 (downward) and of carriage 38 (back to its starting position) are controlled by valves 127', 127 respectively, in return lines 119', 119. These valves are adjusted to effect relatively rapid return movements as contrasted to the forward travel movement.

I claim:

1. Dip-forming apparatus comprising: a mandrel conveyor movable in a predetermined path; a carriage; means supporting said carriage for reciprocating movements in a path paralleling said conveyor path and beneath the same; a first reversible actuator for moving said carriage in said path; a coating liquid containing tank mounted on said carriage for vertical movement; a second reversible actuator for raising and lowering said tank; a control device triggered by said conveyor for starting the operations of both of said actuators at the point of arrival of a mandrel over said tank, whereby to cause said tank to travel forwardly with the mandrel and to simultaneously move upwardly to immerse the mandrel in said coating liquid; a control device actuated by said carriage as it approaches its forward limit of travel, to effect reverse operation of said second actuator for the return of said tank to a lowered position; and a control device, actuated by said tank during said return to lowered position, to effect reverse operation of said first actuator for the return of said carriage to its starting position.

2. Dip forming apparatus as defined in claim 1, wherein said reversible actuators are of a fluid operated type; including respective solenoid operated two position rotary valves for directing actuator fluid to their respective actuators for respective forward and reverse and up and down movements; wherein said starting control device comprises a two position starting switch having connections to both of said solenoid operated valves, said switch having a normal position in which it partially establishes a reversing circuit to the valve of said first mentioned actuator for effecting return movement thereof, and having an alternate position to which it is shifted when triggered by said conveyor and in which it shifts said valves to their positions for effecting forward travel of said carriage and upward movement of said tank respectively; and wherein said carriage return control device comprises an electric switch in said reversing circuit which cooperates with said starting switch in the normal position thereof, for completing said reversing circuit to effect said return movement of the carriage upon return of said tank to its said lowered position.

3. Apparatus as defined in claim 1, wherein said reversible actuators are of a fluid operated type; including respective solenoid operated two position rotary valves for directing actuator fluid to their respective actuators for respective forward and reverse and up and down movements; wherein said starting control device comprises a two position starting switch having connections to both of said solenoid operated valves, said switch having a normal position in which it partially establishes a reversing circuit to the valve of said first mentioned actuator for effecting return movement thereof and having an alternate position to which it is shifted, when triggered by said conveyor and in which it shifts said valves to their positions for effecting forward travel of said carriage and upward movement of said tank respectively; wherein said carriage return control device comprises an electric switch in said reversing circuit which cooperates with said starting switch in the normal position thereof, for completing said reversing circuit to effect said return movement of the carriage upon return of said tank to its said lowered position; and wherein said control device for effecting return of said tank to its lowered position comprises a third electric switch and a connection to the solenoid valve of the second mentioned actuator for returning the same to a normal position in which the latter actuator is operated downwardly.

4. Apparatus as defined in claim 1, including a fail-safe control device for interrupting conveyor movement, said fail-safe device being arranged to be actuated by said conveyor in the event of failure of the tank lowering mechanism with the tank in an elevated position for rendering said fail-safe control device ineffective to arrest conveyor movement.

5. Dip-forming apparatus comprising: an endless conveyor movable in a predetermined path and having regularly spaced means for supporting respective gangs of dipping mandrels in depending positions; a carriage; means supporting said carriage for forward and return travel in a path paralleling and beneath said conveyor path; a first reversible actuator for moving said carriage in said path; a coating liquid containing tank mounted on said carriage for vertical movement; means triggered by said conveyor upon arrival of a mandrel gang at said carriage, to operate said first actuator forwardly for moving said carriage from a starting position in forward travel substantially synchronized with that of said conveyor; a second reversible actuator for raising and lowering said tank; means triggered substantially simultaneously with the commencement of said forward travel, to operate said second actuator for elevating said tank during said forward travel, whereby to immerse the mandrels in said coating liquid without substantial movement of the mandrels transversely of their axes in the coating liquid; means actuated by said carriage as it approaches its forward limit of travel, for operating said second actuator in reverse to effect the return of said tank to a lowered position; and a control device, for reversely actuating said first actuator actuated by said tank during said return to lowered position, to effect the return of said carriage to its starting position.

6. Dip-forming apparatus comprising: an endless conveyor movable in a predetermined path and having regularly spaced supports for carrying respective gangs of dipping mandrels in depending positions; a movable dip-tank unit including a carriage and a coating liquid containing tank mounted on said carriage for vertical movements; means supporting said carriage for forward and return travel in a path paralleling and beneath said conveyor path; a first reversible actuator for moving said carriage in said path; means triggered by said conveyor upon arrival of a mandrel gang at said carriage, to operate said first actuator forwardly for moving said carriage from a starting position in forward travel substantially synchronized with that of said conveyor; a second reversible actuator for raising and lowering said carriage; means triggered substantially simultaneously with the commencement of said forward travel, to operate said second actuator for elevating said tank during said forward travel, whereby to immerse the mandrels in said coating liquid without substantial movement of the mandrels transversely of their axes in the coating liquid; means actuated by said dip-tank unit as it approaches its forward limit of travel, for operating said second actuator reversely to effect the return of said tank to its lowered position; and means triggered by said return tank movement after the coating liquid has separated from the mandrels, to operate said first actuator reversely for effecting return travel of said carriage.

7. Dip-forming apparatus comprising: an endless conveyor movable in a predetermined path and having regularly spaced supports for carrying respective gangs of dipping mandrels in depending positions; a movable dip-tank unit including a carriage and a coating liquid containing tank mounted on said carriage for vertical movement; means supporting said carriage for forward and return travel in a path paralleling and beneath said conveyor path; a first fluid operated reversible actuator for moving said carriage in a horizontal path in forward and return movements; means responding to movement of said conveyor to effect forward operation of said actuator for causing forward travel of said carriage in synchronized relation to said conveyor such as to position said tank beneath a gang of mandrels during such forward travel; a second reversible fluid operated actuator for raising and lowering said carriage; means to effect operation of said second reversible fluid actuated operator for elevating and then lowering said tank during said forward travel so as to immerse said mandrels in said coating liquid and to then withdraw them therefrom; and means operative after such withdrawal, for reversely operating said second actuator to effect return travel of said carriage to its starting position.

8. Dip-forming apparatus comprising: an endless conveyor movable in a predetermined path and having regularly spaced supports for carrying respective gangs of dipping mandrels in depending positions; a movable dip-tank unit including a carriage and a coating liquid containing tank mounted on said carriage for vertical movement; means supporting said carriage for forward and return travel in a path paralleling and beneath said conveyor path; a fluid operated reversible actuator for effecting forward travel of said carriage in approximate synchronism with said conveyor, from a starting position; a first control device actuated by said conveyor upon arrival of a mandrel support of said starting position, for starting the operation of said actuator, thus to initiate said forward travel; throttle means actuated by said mandrel support for regulating the operation of said actuator so as to maintain registration of the mandrels with said tank; a second fluid operated reversible actuator for elevating and then lowering said tank during said forward travel so as to immerse said mandrels in said coating liquid and to then withdraw them therefrom; a second control device triggered by said conveyor substantially at the beginning of said forward travel, to operate said second reversible actuator in the tank elevating direction; a third control device actuated by said dip tank unit as it approaches its forward limit of travel, for initiating reverse operation of said second actuator for downward return movement of said tank; and a third control device triggered by said return tank in the downward movement thereof after such withdrawal to effect reverse actuation of said first actuator for return travel of said carriage to its starting position.

9. Dip forming apparatus as defined in claim 8 and throttle means actuated by said mandrel support for regulating the operation of said actuator so as to maintain registration of the mandrels with said tank.

10. Apparatus as defined in claim 9, wherein said throttle means comprises a rotary throttle valve carried by said carriage in a position above said conveyor and having an actuator lever projecting downwardly therefrom into the path of movement of said mandrel support for engagement thereby in the event of forward movement of said mandrel support relative to said tank during forward travel of said carriage; and a fluid line connection between said throttle valve and said fluid operated actuator; said valve, in response to said engagement of said actuator lever by said mandrel support, having a regulating action effective to slow down the movement of the actuator sufficiently to maintain said registration.

References Cited in the file of this patent

UNITED STATES PATENTS

| | | |
|---|---|---|
| 2,136,185 | Ferngren | Nov. 8, 1938 |
| 2,320,583 | Forro | June 1, 1943 |
| 2,351,202 | Hahne | June 13, 1944 |